United States Patent [19]

Steinbichler et al.

[11] Patent Number: 4,902,454
[45] Date of Patent: Feb. 20, 1990

[54] PROCESS OF TEMPERING PLASTIC INJECTION MOLDING TOOLS

[75] Inventors: Georg Steinbichler, Rottermann; Erhard Smek; Alfred Lampl, both of Schwertberg, all of Austria

[73] Assignee: Engel Maschinenbau Gesellschaft m.b.H., Schwertberg, Austria

[21] Appl. No.: 219,286

[22] Filed: Aug. 10, 1988

Related U.S. Application Data

[63] Continuation-in-part of Ser. No. 907,723, Sep. 15, 1986, abandoned.

[30] Foreign Application Priority Data

Sep. 16, 1985 [AT] Austria .................................. 2691/85

[51] Int. Cl.⁴ .............................................. B29C 45/78
[52] U.S. Cl. .................... 264/40.6; 264/328.16; 425/144; 425/548; 425/552
[58] Field of Search ............. 264/40.6, 328.14, 328.16; 425/143, 144, 384, 407, 547, 552, 548

[56] References Cited

U.S. PATENT DOCUMENTS 4,548,773 10/1985 Suh et al. ......................... 264/328.16
4,608,218 8/1986 Rümmler et al. .................... 425/144
4,798,692 1/1989 Blersch et al. ................... 264/328.16

FOREIGN PATENT DOCUMENTS 56-37108 4/1981 Japan .
56-55219 5/1981 Japan .
57-195610 12/1982 Japan .
58-173610 10/1983 Japan .
59-120411 7/1984 Japan .
60-83819 5/1985 Japan .

OTHER PUBLICATIONS

Plastics Engineering Handbook, 4th edition, 1976, pp. 143-145, 618 and 619.

Primary Examiner—Jill L. Heitbrink
Attorney, Agent, or Firm—McGlew & Tuttle

[57] ABSTRACT

A process for tempering tools, for use on the form tools of extrusion forming machines. In the injection molding tools there are conduction circuits for a coolant which are connected to ducts for the inflow and backflow of the coolant. Valves (4) control the throughflow of the coolant. There are temperature sensors (5, 6) in the ducts for the inflow and backflow of the coolant. The temperature sensors (5, 6) are connected to a computer (7) which controls the opening and closing times of the valves (4) as a function of a nominal difference fed in between the inflow and backflow temperatures of the coolant. Advantageously, a temperature sensor (3) which is also connected to the computer (7) is provided on the form tool.

2 Claims, 4 Drawing Sheets

PROCESS OF TEMPERING PLASTIC INJECTION MOLDING TOOLS

This is a continuation-in-part of application Ser. No. 907,723, filed Sept. 15, 1986, now abandoned.

FIELD AND BACKGROUND OF THE INVENTION

The invention relates to an apparatus for tempering tools, for use on the form or mold tools of extrusion forming machines. In such injection molding tools, conduction circuits for a coolant are provided as well as ducts for the inflow and discharge of the coolant. Valves are also provided which control the throughflow or volumetric flow rate of the coolant.

The extrusion forming machines currently known comprise tool cooling or tempering systems in which the throughflow of the coolant, generally water, can be adjusted by turning handwheels, for example. Using an inspection glass or tube, the injection molding operator is able to estimate the quantity of medium flowing through the injection molding tool in a given time span. Obviously, with this procedure, the assessment of the quantity of coolant is imprecise. Heretofore, the actual temperature of the tool has been determined in an equally imprecise manner. Thus, for example, the tool temperature is deduced from the quality of the injection molded product or the tool temperature is determined from the outside, e.g. by applying a temperature measuring instrument to the halves of the tool, or by simply touching them with the hand.

This known system has serious disadvantages. Not only is such a system inaccurate the optimum volumetric rate of flow of coolant is difficult to determine and adjust. Other disadvantages are the fact that, during operation of the extrusion forming machine, various disturbances occur, e.g. changes in the pressure or temperature of the coolant, variations in the ambient temperature, changes in the diameter of the tempering channel or the transfer of heat. Moreover, any production stoppages will change the temperature of the tool, which known extrusion forming machines will not react to directly.

SUMMARY AND OBJECTS OF THE INVENTION

It is an object of the invention to provide a cooling or tempering apparatus for the form or mold tools of extrusion forming machines, which will make it possible to produce high precision moldings and, in spite of any disturbances which may occur, ensures that the temperature pattern in the injection molding tool is reproducible in terms of time. It should also be possible to ensure the desired temperatures of the tool while using the minimum quantity of coolant.

This is achieved, according to the invention, in that temperature sensors are provided for detecting the inflow and backflow temperatures of the coolant or the temperature of the mold tool. These sensors are connected to a computer, e.g. a microprocessor, such that the computer controls the opening and closing times of the valves as a function of as nominal difference which has been fed into the computer between the inflow and backflow temperatures of the coolant or based on the sensed temperature of the mold tool.

Advantageously, there is at least one temperature sensor located on the form or mold tool and connected to the computer, and the computer controls the closing and opening times of the valves as a function of the actual values delivered by the temperature sensor by comparison with a nominal value which has been fed in.

In this way, the person overseeing the extrusion forming machine can determine whether more or less coolant is being used to maintain the same tool temperature. If very stringent requirements are imposed on the quality of the injection molded products, a higher volumetric rate of flow of coolant will be provided. However, if the quality is less critical, some coolant water can be saved, as this will have a favorable effect on the operating costs of the extrusion forming machine.

In a further embodiment of the invention, each half of the form tool has a temperature sensor.

In order to achieve absolutely precise tempering of the too it is provided, according to a particular embodiment of the invention, that a temperature sensor is associated with each conduction circuit in the form tool.

In order to enable the apparatus to be calibrated to the desired tool temperature in each case, it is envisaged in a preferred embodiment of the invention that, when the computer receives from the temperature sensor an actual value which corresponds to the nominal value fed in, it will measure, in an injection cycle, the temperature difference between the inflow and backflow of the coolant or the temperature of a mold tool, successively, with the valves open throughout a cooling term of at least one cycle and with the valves closed throughout a term equal to the cooling term of at least one entire cycle.

The computer may be adapted to be connected to a read or memory unit for a data carrier.

Moreover, a throughflow heater or a cooling unit may be connected to the duct for the inflow of the coolant.

The throughflow heater will be used when very small masses of plastics (in relation to the tool) are being processed. The cooling of the water which serves as a coolant will take place chiefly when the ambient temperature is high.

Accordingly, it is an object of the invention to provide a method for tempering tools for use with plastic injection molding tools having a conduction circuit for circulation of coolant, a coolant inflow duct and a coolant discharge duct connected to the conduction circuit, one of the inflow and discharge ducts of each tool including at least one valve having an open state allowing a volumetric rate of flow of coolant and a closed state in which there is no volumetric rate of flow of the coolant, a temperature sensor associated with each molding tool for sensing the temperature of the molding tool. According to the method, working cycles are continuously performed by the molding tool including injecting the molding tools with plastic material and opening the molding tools after completion of the cycle. The temperature of the molding tools is continuously measured.

After the temperature of the molding tools has reached a predetermined nominal value, a cooling term begins during which the valves are open. The time duration of the cooling term is equal to at least one working cycle of the molding machine. After the cooling term has expired, the temperature difference between the nominal value at which time the cooling term was initiated and the temperature at the end of the cooling term is determined in a computer. At the end of the cooling term a second term is initiated in which the valves are closed. The time duration of the second term is equal to the time duration of the cooling term. The temperature change during the second term or between the initiation of the second term and the end of the second term is computed and stored in the memory of a computer. The temperature of the molding tools is then maintained within a tolerance range by the opening and closing of the valves based on the stored information of temperature change during the cooling term and the second term.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

Figure 1:
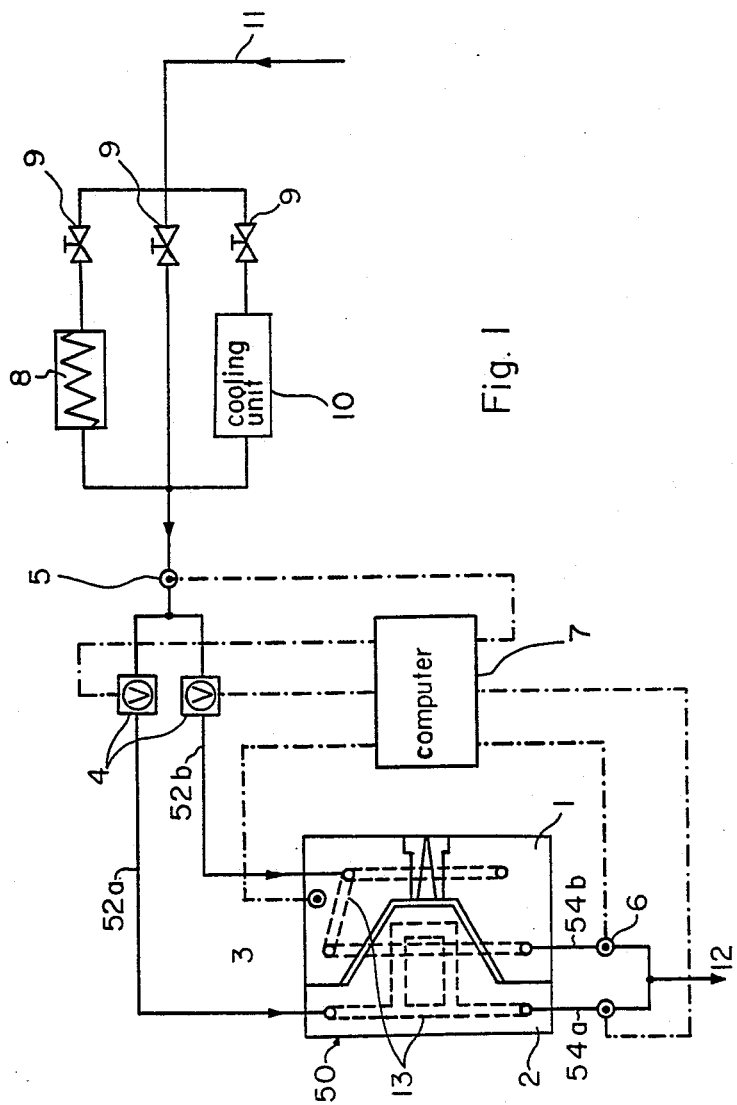
FIG. 1 shows a schematic view of the coolant circuit and the control.

The parts of the extrusion forming machine which do not belong directly to the invention are not included in the drawings; they should be constructed according to the conventional prior art.

DESCRIPTION OF THE PREFERRED EMBODIMENT

Referring to the drawings in particular, the invention embodied therein includes a plastic injection molding tool generally designated 50 having a nozzle tool portion or tool half 1 and a closure tool portion or closure tool half 2. Each of the tool halves include a conduction circuit 13 for circulation of coolant. Tool half 1 has an inflow duct or inlet duct 52b and a discharge duct 54b. Tool half 2 has an inflow duct or inlet duct 52a and a discharge duct 54a.

The throughflow of coolant is controlled by means of valves 4, which may be magnetic valves or the like.

In the embodiment shown, the tool half 1 contains a temperature sensor 3 for detecting the temperature of the tool half 1. This temperature sensor 3 is connected to a computer 7.

Also connected to the computer 7 are a temperature sensor 5 for the forward-flow temperature of the coolant and a temperature sensor 6 for the back-flow temperature of the coolant.

Upstream of the temperature sensor for the forward-flow temperature, a throughflow heater 8 and a cooling unit 10 are connected to the water supply duct 11. By opening one of the slide valves 9 and closing the two other slide valves 9 it is possible to determine whether normal, cooled or heated water is being fed into the extrusion forming machine.

The water backflow or water discharge duct is designated 12.

The apparatus according to the invention operates as follows (see FIG. 3):

The operator is able to set the desired tool temperature $T_d$ using the visual display screen of the microprocessor controls. The temperature sensor 3 in the tool half 1 measures the temperature of the tool at a specific time in the cycle or continuously.

After a predetermined nominal temperature $T_n$ has been reached, the characteristics of the tool are tested by means of the temperature drop or temperature rise measured throughout two gauging or calibration terms.

For this purpose, the apparatus performs two gauging terms of equal duration. In the first calibration term, the valves 4 stay open throughout the entire cycle. In the second calibration term the valves 4 remain closed throughout the entire cycle time. After the computer 7 has determined the two temperature differences, it calculates the relationship between open and closed valve time to be prescribed for the valves 4 so that the preselected tool temperature $T_d$ is maintained.

If a given tolerance band ($T_d$ tolerance) for the tool temperature is exceeded as a result of changes in the forwardflow temperature or pressure conditions, the calibration is repeated.

Figure 2:
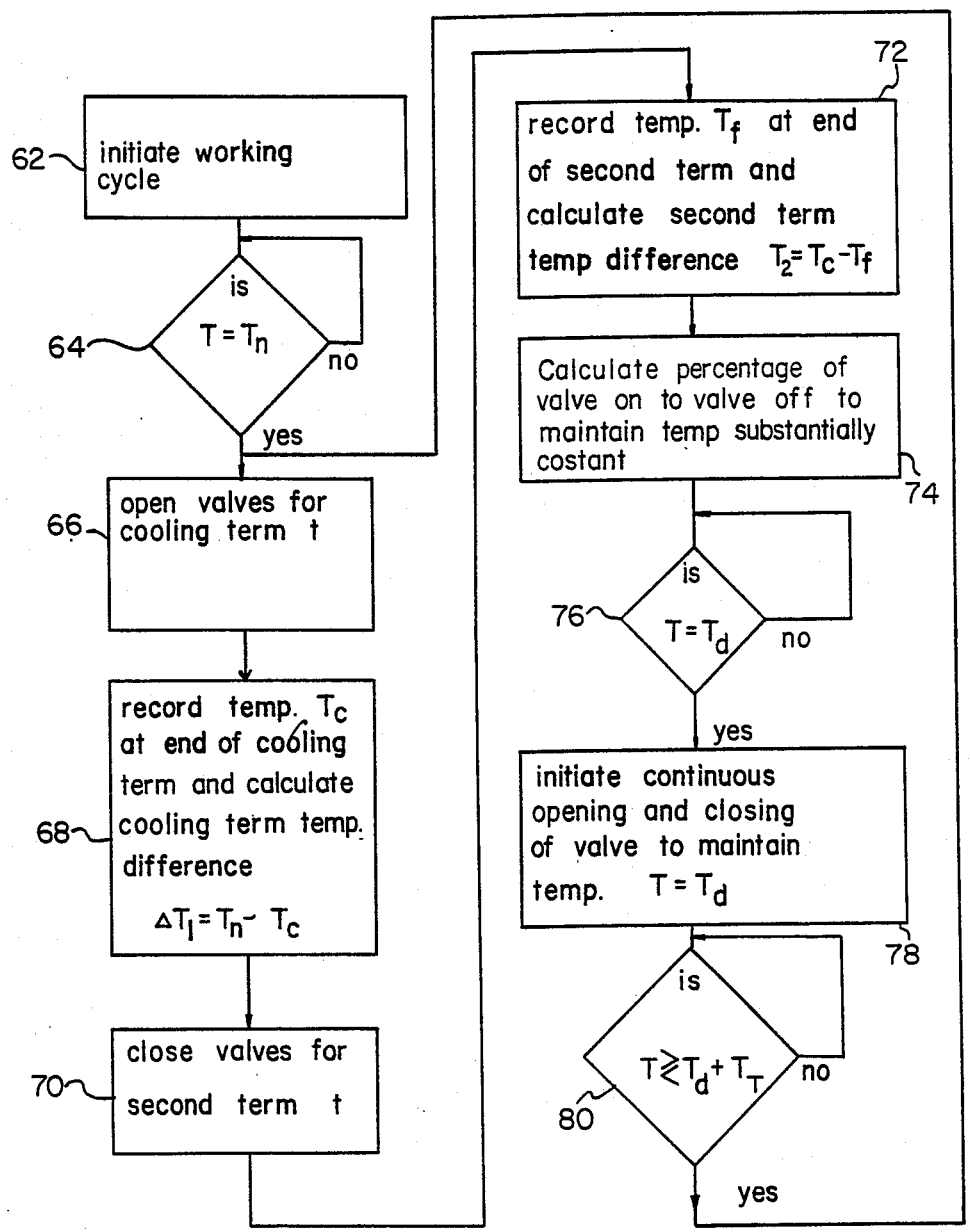
FIG. 2 is a flow diagram showing the steps to be taken by a computer or the like controlling valves based on temperature information.

The method of the invention can also be appreciated by referring to FIG. 2 which shows the flow chart of the computer employing the method of the invention. As shown in FIG. 2, the working cycle of the molding process including closing the molding tools, injecting the molding tools with plastic material and opening the molding tools is initiated as shown at function block 62. This corresponds with the area of time labelled starting the machine in the temperature time graph of FIG. 3. The temperature is either continuously monitored or monitored at some point in each cycle and checked to determine if the temperature has risen to some nominal temperature level $T_n$. As shown in function block 64, the temperature monitored is compared to the nominal value. If it is less than the nominal value the working cycles continue. When the temperature has reached the nominal value the computer moves to the next step in the method by opening the valves for a cooling term equal to time t. This step is shown in function block 66 and corresponds to the gauging time stage labelled full cooling in the time temperature graph of FIG. 3. Next the temperature $T_c$ at the end of the cooling term is recorded and the temperature difference for the cooling term is $\Delta T_1 = T_n - T_c$ as shown in block 68 of FIG. 2. This temperature difference is stored in the computer for later use. At the end of the cooling term the valves are closed for a term t. The second term t is exactly equal to the first term in time. This is shown at function block 70 in FIG. 3.

Again the temperature at the end of the second term is recorded and the temperature difference between the end of the first term and the end of the second term $\Delta T_2$ is calculated as shown in function block 72 of FIG. 2.

Figure 3:
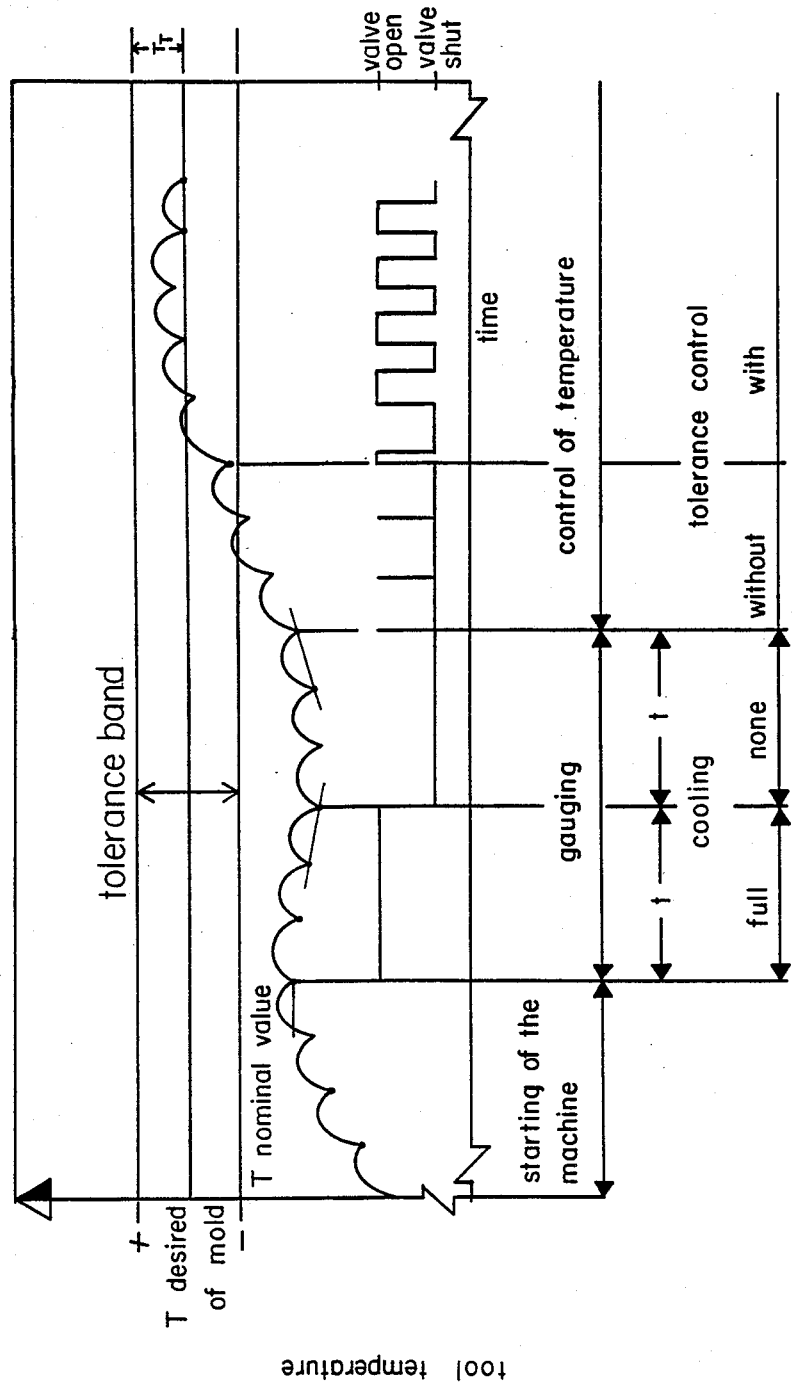
FIG. 3 is a graph showing temperature T of the mold plotted against time (t)

From the temperature difference $\Delta T_1$ and $\Delta T_2$ each based on an equal term of time t, the computer may calculate a ratio of open valve to closed valve to maintain a desired temperature $T_d$ as shown at step 74 in FIG. 2. That is, step 74 calculates an open valve shut valve ratio so as to maintain the tool temperature at the desired temperature $T_d$ during the continuous working of the injection molding tools. After the opening of the valves for a time t and closing of the valves for a time t the tools are allowed to increase in temperature until the temperature of the tools reaches the desired temperature $T_d$ within the tolerance band. This is shown in the temperature time graph of FIG. 3 in the period of time labelled without tolerance control. That is, the machine is allowed to reach the desired temperature before any further steps are taken. As shown in FIG. 2, step 76 shows a comparison of the temperature during this period until the temperature of the tool reaches the desired temperature $T_d$. At this point the continuous opening and closing of the valves is initiated to maintain the temperature substantially at $T_d$. As shown in FIG. 3, the opening and shutting of the valves is continuous to keep the temperature of the mold as close to the desired temperature $T_d$ as possible. It should be noted that the duration of time for the valve being open and the duration of time for the valve being shut do not necessarily have to be equal. That is, it may be found for a certain system that the percentage of valve on status must be greater than the percentage of valve off status to maintain a temperature which is substantially constant.

As shown at step 80, if the temperature of the mold leaves the tolerance band (the tolerance band extending a tolerance temperature $T_t$ above and below the desired temperature $T_d$) the calibration stage or engaging stage begins again in order to refine the affects of the valve being open and valve being shut with regard to the particular mold being utilized.

Figure 4:
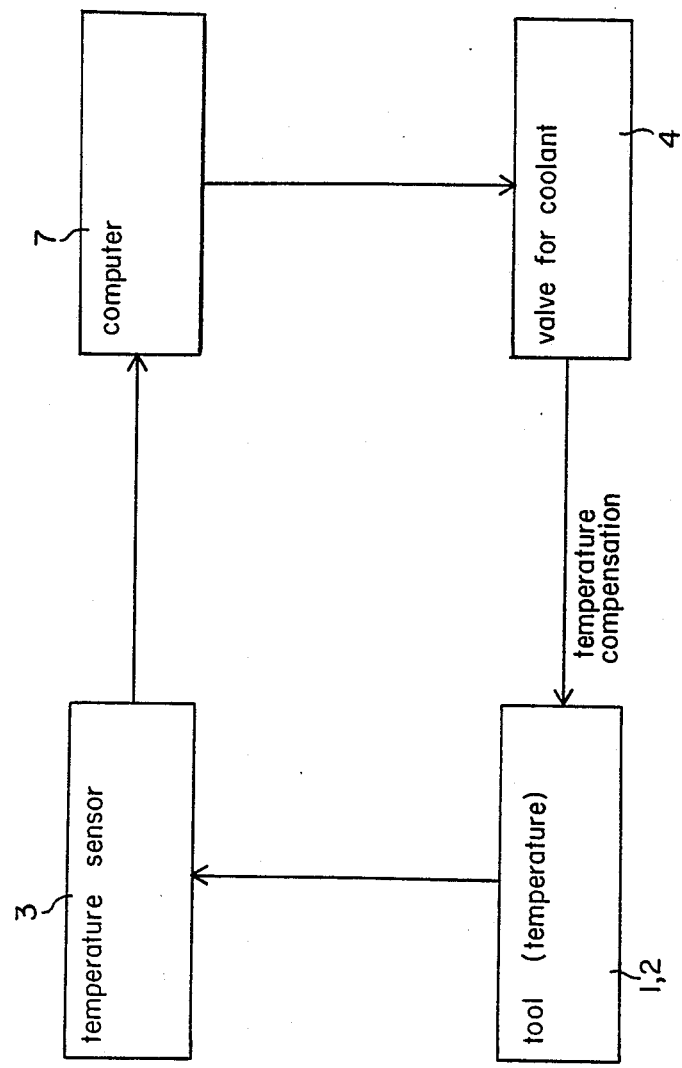
FIG. 4 is a schematic diagram showing the interaction between the temperature sensor, computer, valve and tool.

FIG. 4 shows the general relationship between the tool temperature, temperature sensor, computer and valve coolant. By this arrangement, the opening and closing of the valves has an affect on the tool temperature which is sensed by the sensor (such as sensor 3) which information is directed to the computer for a determination of the proper valve open valve closed (valve on valve off) control.

It is possible to provide a temperature sensor 3 for each cooling or tempering circuit in the two halves 1, 2 of the tool. This is not always possible with small tools and for this reason the computer 7 may correct the basic opening time of the valves determined, in accordance with the measured and given temperature difference between the forward and backward flow (temperature sensor 5 and temperature sensor 6) in the individual ducts. The desired temperature difference between the forward and backward flow can be preselected by the machine setter in accordance with economical and technical considerations. Thus, on the basis of the information obtained, using a single temperature sensor 3 in he tool half 1, it is also possible to prevent overheating of the tool half 2 which is at the closure end.

With the apparatus according to the invention, the desired tool temperature and the temperature difference between the entry and outlet of coolant water, i.e. between the inflow and backflow is kept constant.

While a specific embodiment of the invention has been shown and described in detail to illustrate the application of the principles of the invention, it will be understood that the invention may be embodied otherwise without departing from such principles.

What is claimed is:

1. A method for use with plastic injection molding tools, each plastic injection molding tool having a conduction circuit for circulation of a coolant, a coolant inflow duct and a coolant discharge duct connected to the conduction circuit, one of the inflow and discharge ducts of each plastic injection molding tool including at least one valve having an open state allowing a volumetric rate of flow of coolant and a closed state in which there is no volumetric rate of flow of the coolant, a temperature sensor being associated with each plastic injection molding tool for sensing the temperature of each plastic injection molding tool, the method comprising the steps of: continuously performing working cycles including closing the plastic injection molding tools, injecting the plastic injection molding tools with plastic material and opening the plastic injection molding tools; continuously measuring the temperature of the plastic injection molding tools, initiating a cooling term by opening the valves upon sensing the temperature of the plastic injection molding tools reaching a predetermined nominal value, said cooling term having a time duration of at least one of said working cycles; storing a temperature difference between said nominal value at which time said cooling term was initiated and the temperature at the end of said cooling term in a computer; initiating a second term in which the valves are closed, said second term having a time duration equal to said cooling term; storing the temperature change between the initiation of said second term and the end of said second term; and, controlling the opening and closing of said valves as a function of said stored information to maintain the temperature of said molding tools within a predetermined tolerance range.

2. A method according to claim 1, wherein said step of controlling the opening and closing of the valves includes calculating the percentage of time for the valve to be open with respect to the percentage of time for the valve to be closed to maintain the mold temperature substantially constant based on the temperature differences for the cooling term and second term.

* * * * *